United States Patent [19]
Ostwald

[11] Patent Number: 6,130,800
[45] Date of Patent: Oct. 10, 2000

[54] DATA STORAGE LIBRARY WITH CARTRIDGE ACCESS MECHANISM

[75] Inventor: Timothy C. Ostwald, Louisville, Colo.

[73] Assignee: Storage Technology Corporation, Louisville, Colo.

[21] Appl. No.: 09/111,836

[22] Filed: Jul. 8, 1998

[51] Int. Cl.[7] .................................................. G11B 15/68
[52] U.S. Cl. .............................................................. 360/92
[58] Field of Search ................................ 360/92; 369/36, 369/38, 178; 414/276

[56] References Cited

U.S. PATENT DOCUMENTS

| | | |
|---|---|---|
| 4,779,151 | 10/1988 | Lind et al. . |
| 4,907,889 | 3/1990 | Simone ........................................ 360/92 |
| 4,937,690 | 6/1990 | Yamashita et al. .......................... 360/92 |
| 5,128,817 | 7/1992 | Herger et al. ............................... 360/92 |
| 5,278,708 | 1/1994 | Apple et al. . |
| 5,336,030 | 8/1994 | Ostwald et al. . |
| 5,454,485 | 10/1995 | Dalziel . |
| 5,498,116 | 3/1996 | Woodruff et al. ........................... 360/92 |
| 5,508,859 | 4/1996 | Hu et al. .................................... 360/92 |
| 5,546,315 | 8/1996 | Kleinschnitz . |
| 5,640,288 | 6/1997 | Horie ......................................... 369/36 |

Primary Examiner—Allen Cao
Attorney, Agent, or Firm—Wayne P. Bailey; Brooks & Kushman P.C.

[57] ABSTRACT

A data storage library is provided which comprises a housing with an access door provided therein. A plurality of cartridge storage arrays are mounted within the housing, wherein the front of each array is positioned to face an internal space of the housing, preferably occupied by a robotic arm. In this configuration, cartridges contained within the arrays are generally unable to be accessed by an operator. Of the plurality of cartridge storage arrays, at least one array is movable. A rotating mechanism is coupled to the movable array, and the rotating mechanism is operable to turn the movable array from a first position inside the housing and facing the internal space, to a second position inside the housing and facing at least partially away from the internal space, allowing cartridges contained within the plurality of cartridge storage arrays to be accessed by an operator through the access door. In a preferred embodiment, the rotating mechanism comprises a linkage arm pivotally connecting the access door to the movable array, wherein opening the access door rotates the linkage arm to turn the movable array from the first position to the second position.

3 Claims, 6 Drawing Sheets

DATA STORAGE LIBRARY WITH CARTRIDGE ACCESS MECHANISM

TECHNICAL FIELD

This invention relates to data storage libraries, and more particularly to a data storage library with a cartridge access mechanism for identifying, loading, and unloading cartridges maintained within the library.

BACKGROUND ART

A popular device for handling large amounts of information in a data processing system is the data storage library. These systems store and manage large numbers of cartridges containing magnetic tape on which data is recorded. Typically, a data storage library is comprised of arrays of uniquely identified storage cells, each cell being formed to contain a single tape cartridge. The cell arrays each hold a plurality of tape cartridges, and each tape cartridge has some kind of identifying information, such as a label or bar code. Typically, the arrays surround a robotic arm which has an optical system for selecting cartridges, and is operable to locate a particular storage cell and retrieve and transport a tape cartridge therefrom.

Given the large capacity of data storage libraries, there is a continual need for an operator to load and unload cartridges from the library. One conventional technique is to implement a small access port which consists of a bank of storage cells mounted to a panel which rotates out from the storage area to present itself to an operator on the outside of the library enclosure. This technique is time consuming, since the access port must be opened many times to accomplish a full capacity load. In addition, the storage capacity of the library is reduced by the number of fixed storage cells replaced by the panel. Furthermore, such an access port often requires additional, costly motorized components.

For mass loading and unloading of large numbers of cartridges, more direct access to the cartridges contained within the library, such as through an access door, is preferable. However, each array is usually positioned so that the front of the array, the side from which the cartridges may be identified and accessed, faces the robotic arm. Since the arrays are typically mounted in close proximity to each other and surrounding the robotic arm, the arrays adjacent the access door have their backs facing the operator, denying the operator access to the cartridges or visibility of the cartridge identification labels.

DISCLOSURE OF THE INVENTION

Therefore, it is an object of the present invention to provide a data storage library with a cartridge access mechanism which facilitates easy viewing and access of cartridges within the library.

It is another object of the present invention to provide a data storage library with a cartridge access mechanism which allows for convenient mass loading and unloading of cartridges.

It is another object of the present invention to provide a cartridge access mechanism which minimizes the loss of storage capacity in the data storage library.

It is another object of the present invention to provide a cartridge access mechanism that operates reliably within a data storage library without the need for additional motors and associated electronics.

Accordingly, a data storage library is provided which comprises a housing with an access door provided therein. A plurality of cartridge storage arrays are mounted within the housing, wherein the front of each array is positioned to face an internal space of the housing, preferably occupied by a robotic arm. In this configuration, cartridges contained within the arrays are generally unable to be accessed by an operator. Of the plurality of cartridge storage arrays, at least one array is movable. A rotating mechanism is coupled to the movable array, and the rotating mechanism is operable to turn the movable array from a first position inside the housing and facing the internal space, to a second position inside the housing and facing at least partially away from the internal space, allowing cartridges contained within the plurality of cartridge storage arrays to be accessed by the operator through the access door. In a preferred embodiment, the rotating mechanism comprises a linkage arm pivotally connecting the access door to the movable array, wherein opening the access door rotates the linkage arm to turn the movable array from the first position to the second position.

The above objects and other objects, features, and advantages of the present invention are more readily understood from a review of the attached drawings and the accompanying specification and claims.

BEST MODES FOR CARRYING OUT THE INVENTION

Figure 1:
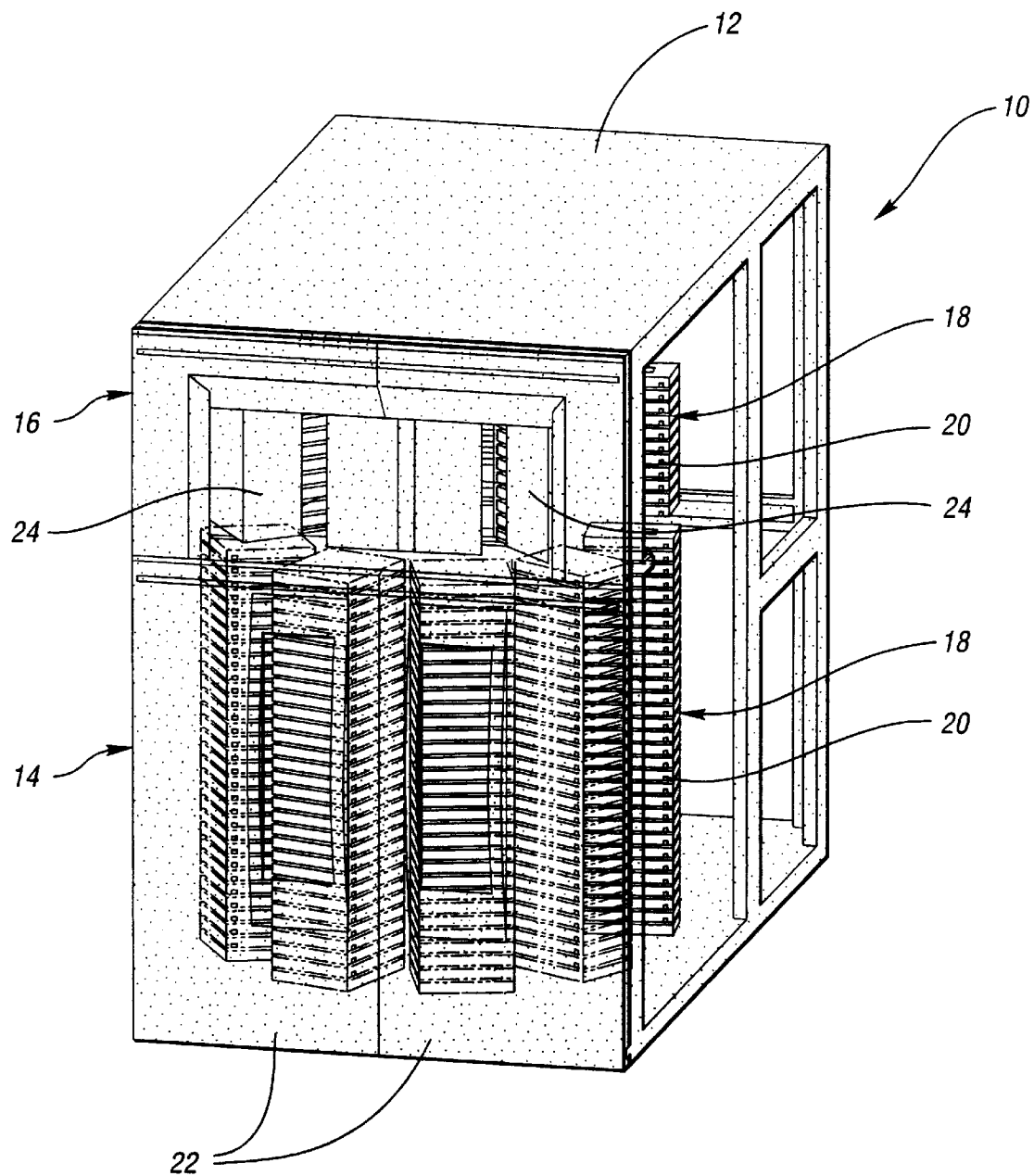
FIG. 1 is a perspective view of a data storage library in accordance with the present invention.

Referring first to FIG. 1, a data storage library 10 is indicated generally by reference numeral 10. Data storage library 10 is provided with a suitable housing 12 to ensure operator safety and data security. In a preferred embodiment, library 10 includes a lower section 14 and an upper section 16. As shown, data storage library 10 contains a plurality of arrays 18, wherein each array 18 consists of a plurality of individual storage cells 20 sized to hold tape cartridges (not shown). Given the large capacity of data storage library 10, loading and unloading of cartridges from library 10 is often done by an operator on a daily basis. Typically, lower section 14 of library 10 is utilized for mass access of cartridges stored therein, while upper section 16 is restricted to more limited cartridge access. Upper section 16 is often referred to as a cartridge access port (CAP). In data storage library 10 of the present invention, main access doors 22 are provided in lower section 14, and limited access doors 24 are provided in upper section 16. The function of doors 22 and 24 in providing cartridge access will be described below.

FIGS. 2–6 show views of lower 14 and upper 16 sections of data storage library 10. As shown, library 10 contains a plurality of cartridge storage arrays 18 mounted to surround an actuator, such as a robotic arm 26. Arrays 18 may be mounted in either a permanent or a removable manner within library 10. Although a circular arrangement of storage arrays 18 is depicted herein, the present invention applies equally well to libraries utilizing other storage configurations and housing structures. Preferably, the operation of library 10 is automated and is directed by a processor, such as a host computer (not shown). The processor provides signals to robotic arm 26, to control its motion and operation, and therefore control the handling and storage of cartridges within data storage library 10. Robotic arm 26 is disposed within the internal space 28 of library 10 not occupied by arrays 18. The processor also controls the operation of an optional tape drive 30 located within data storage library 10.

Figure 2:
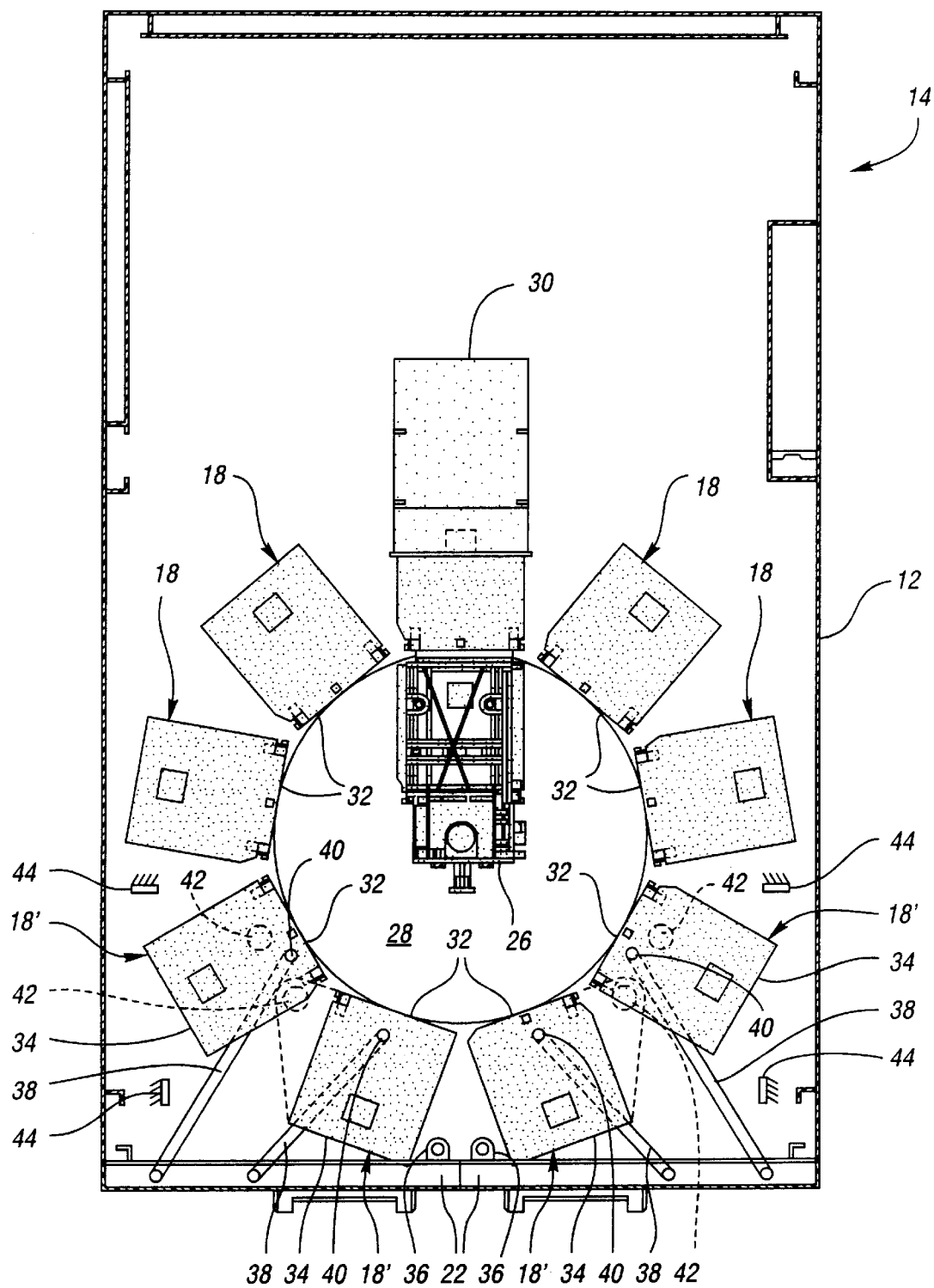
FIG. 2 is a top, sectional view of a lower section of the data storage library of the present invention shown with the main access doors closed.

As shown in the top, sectional view of lower section 14 of library 10 depicted in FIG. 2, each array 18 is usually positioned so that its front 32, the side from which cartridges may be identified and accessed, faces robotic arm 26. Since arrays 18 are typically mounted in close proximity to each other and surrounding robotic arm 26, arrays 18' adjacent main access doors 22 have their backs 34 facing the operator. As described below, the present invention provides visibility and access to the cartridges in all storage arrays 18 and 18' by allowing at least one of the adjacent arrays 18' to move when main access doors 22 are opened. In the preferred embodiment, all four arrays 18' are movable.

As in any typical library enclosure, data storage library 10 is made secure by providing locks 36 for main access doors 22. Locks 36 preferably comprise simple cabinet latches, with a spring-loaded plunger provided on each main access door 22, and mating holes provided in latch plates affixed to the interior of housing 12. Alternatively, electric latches, similar to those used in the automotive industry, could be used to lock main access doors 22 until an electrical signal from the processor is supplied. Additionally, the present invention utilizes locks 36 to latch movable arrays 18' in a first, closed position facing internal space 28 when main access doors 22 are closed.

Figure 3:
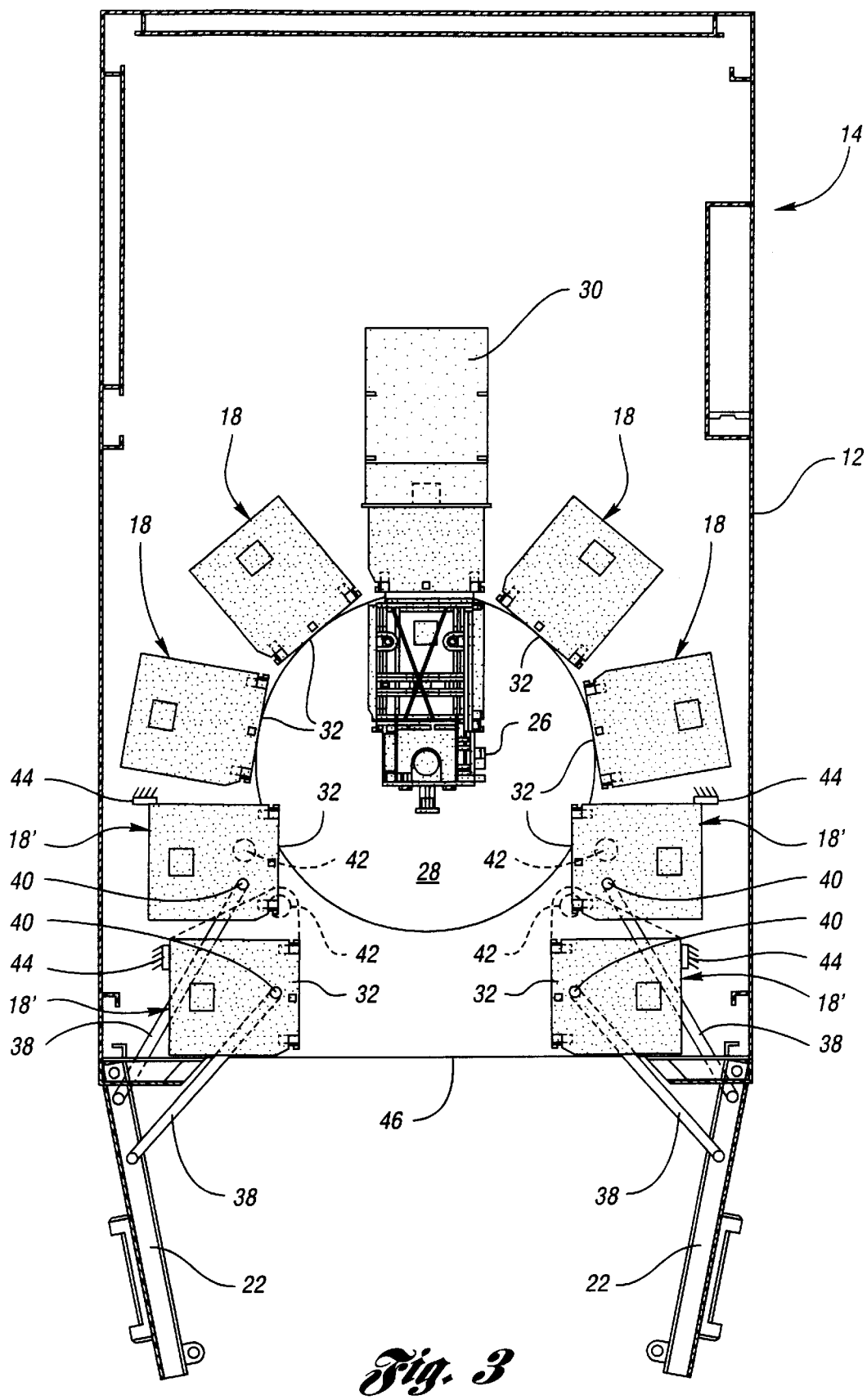
FIG. 3 is a top, sectional view of the lower section of the data storage library of the present invention shown with the main access doors open.

Referring now to FIGS. 2 and 3, movable arrays 18' are pivotally mounted to housing 12. A rotating mechanism is coupled to each movable array 18', wherein the rotating mechanism is operable to turn movable arrays 18' from their first, closed position (FIG. 2) inside housing 12 and facing internal space 28 to a second, open position (FIG. 3) inside housing 12 and facing at least partially away from internal space 28. Once movable arrays 18' are in their open position, cartridges contained within the plurality of cartridge storage arrays 18 may be easily viewed and accessed by an operator through main access doors 22.

Figure 4:
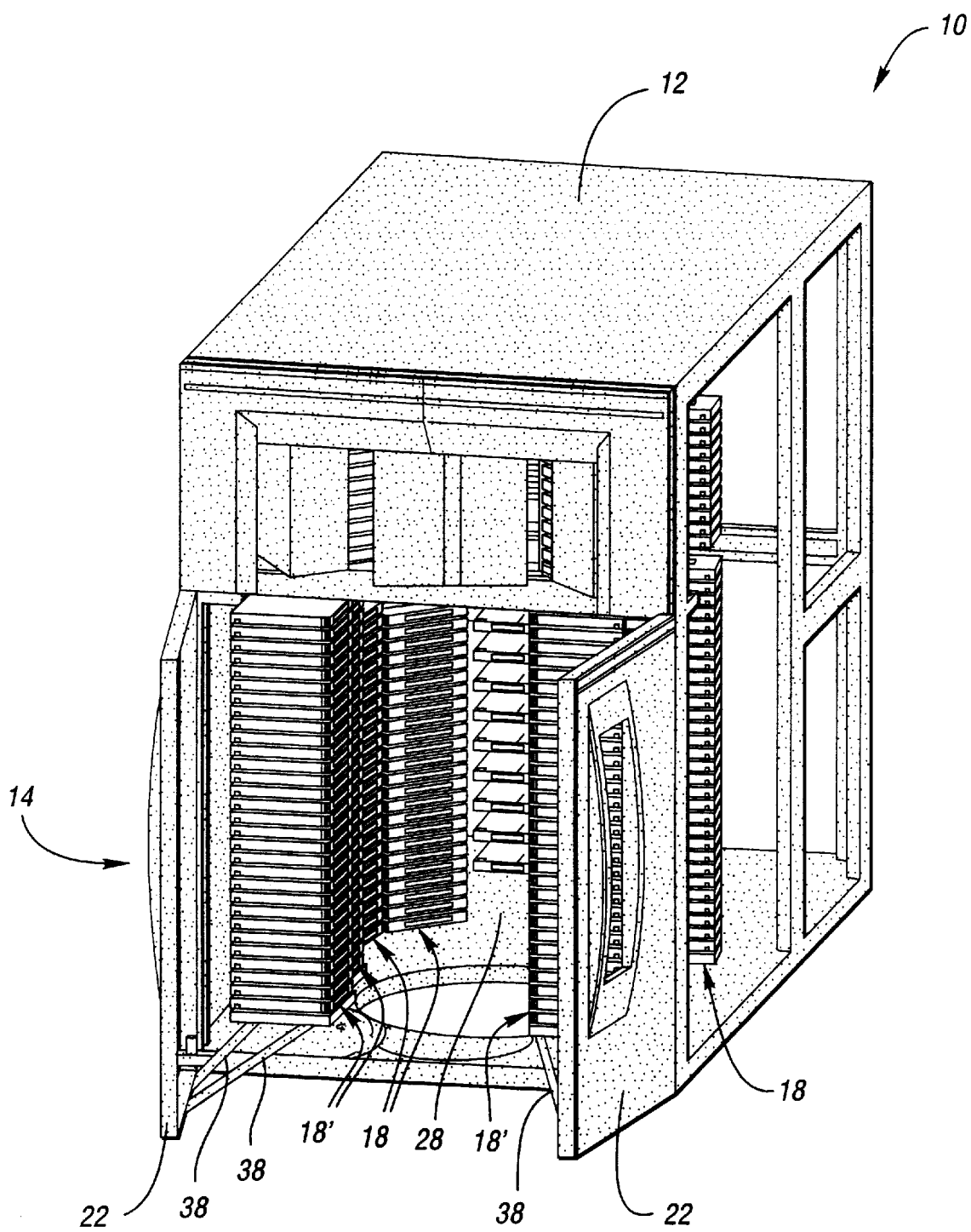
FIG. 4 is a perspective view of the data storage library of the present invention shown with the main access doors open.

In the preferred embodiment, the rotating mechanism comprises linkage arms 38. Linkage arms 38 are pivotally connected at one end to a main access door 22, and at the other end to a pivot joint 40 built into the bottom of each movable array 18'. As shown in FIG. 3, linkage arms 38 cause any rotation of main access doors 22 to reflect a similar rotation of movable arrays 18'. Pivot axles 42 are affixed to the end of each movable array 18', and are located to allow movable arrays 18' to rotate between accurate closed positions and optimum open positions for operator access. Stops 44 affixed inside housing 12 establish the open position of movable arrays 18' and limit the swing of main access doors 22. Preferably, as shown in FIGS. 3 and 4, movable arrays 18' rotate to an angle where the plane of the front 32 of each array 18' is normal to the front 46 of housing 12, such that the front of two of movable arrays 18' face the front of the other two movable arrays 18'. Of course, rotating mechanisms other than linkage arms 38 could be utilized in the present invention to rotate movable arrays 18'.

Although both main access doors 22 are shown in the open position in FIG. 3, the cartridge access mechanism of the present invention does not require both doors 22 to be open to function properly. Each of main access doors 22 functions independently, so that either side of library 10 may be accessed individually without the need for opening both doors 22. In an alternative embodiment, only one main access door 22 may be provided.

Therefore, the present invention provides a data storage library 10 with a cartridge access mechanism which facilitates easy viewing and access of cartridges within the library 10. The data storage library of the present invention preserves library storage capacity by using existing storage arrays 18' as a cartridge access mechanism instead of reducing library space with a separate loading device. In addition, mass loading and unloading of cartridges from library 10 may be accomplished conveniently through main access doors 22. Movable arrays 18' are rotated within housing 12 and do not protrude out of housing 12, thereby providing a compact access mechanism. Furthermore, additional motorized components are not required, as simple mechanical linkage arms 38 are utilized to rotate movable arrays 18'.

In an alternative embodiment of the present invention, a more limited cartridge access mechanism is implemented. In this embodiment, depicted in the top, sectional views of upper section 16 of library 10 shown in FIGS. 5 and 6, the rotating mechanism only allows manual access to selected arrays 18" in data storage library 10. Upper section 16 includes an operator shield, such as stationary baffles 48, to deny access to internal space 28 where robotic arm 26 may be working. Therefore, robotic arm 26 may continue to work even when limited access doors 24 are opened.

Figure 5:
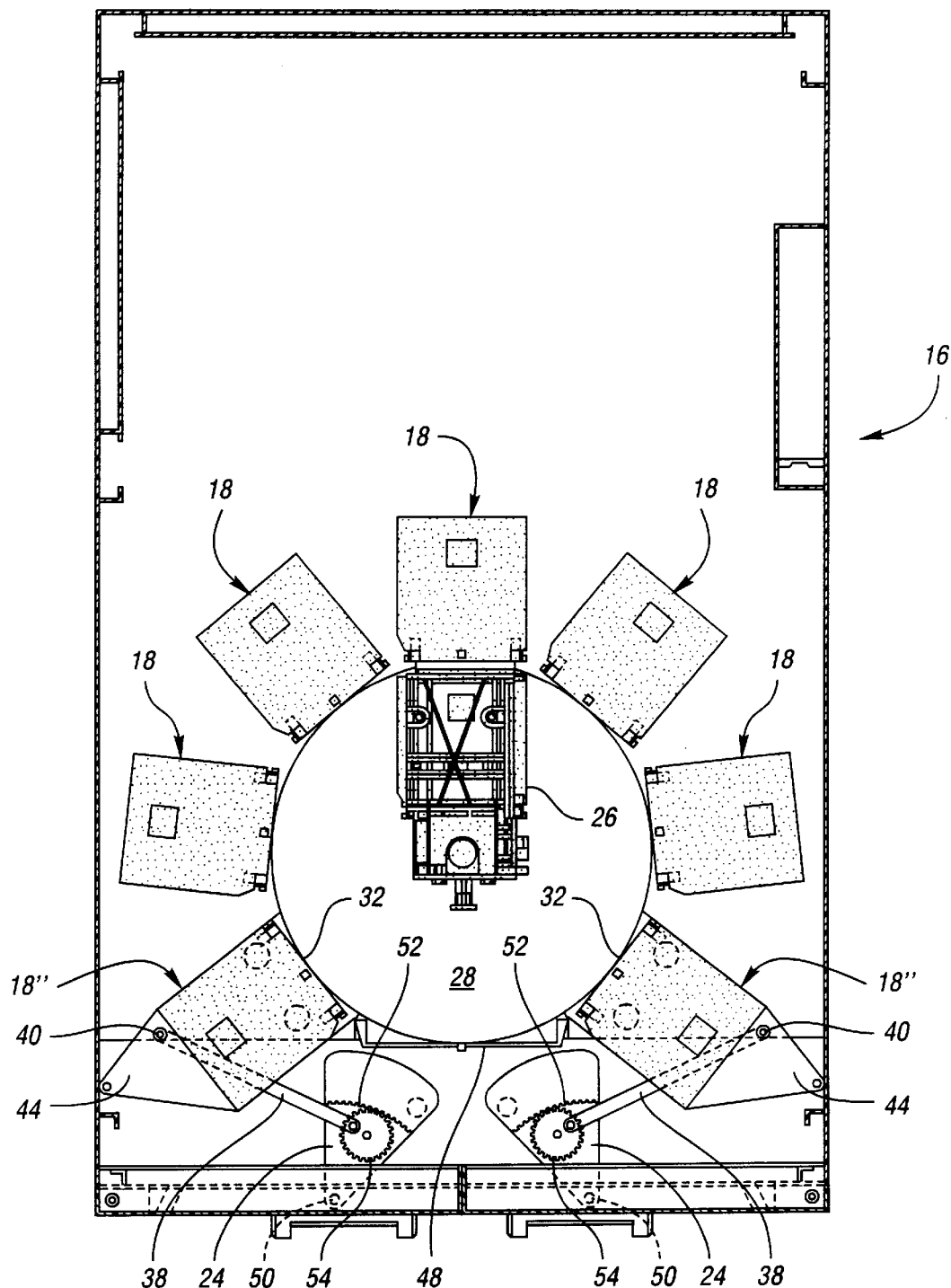
FIG. 5 is a top, sectional view of an upper section of the data storage library of the present invention shown with the limited access doors closed.
Figure 6:
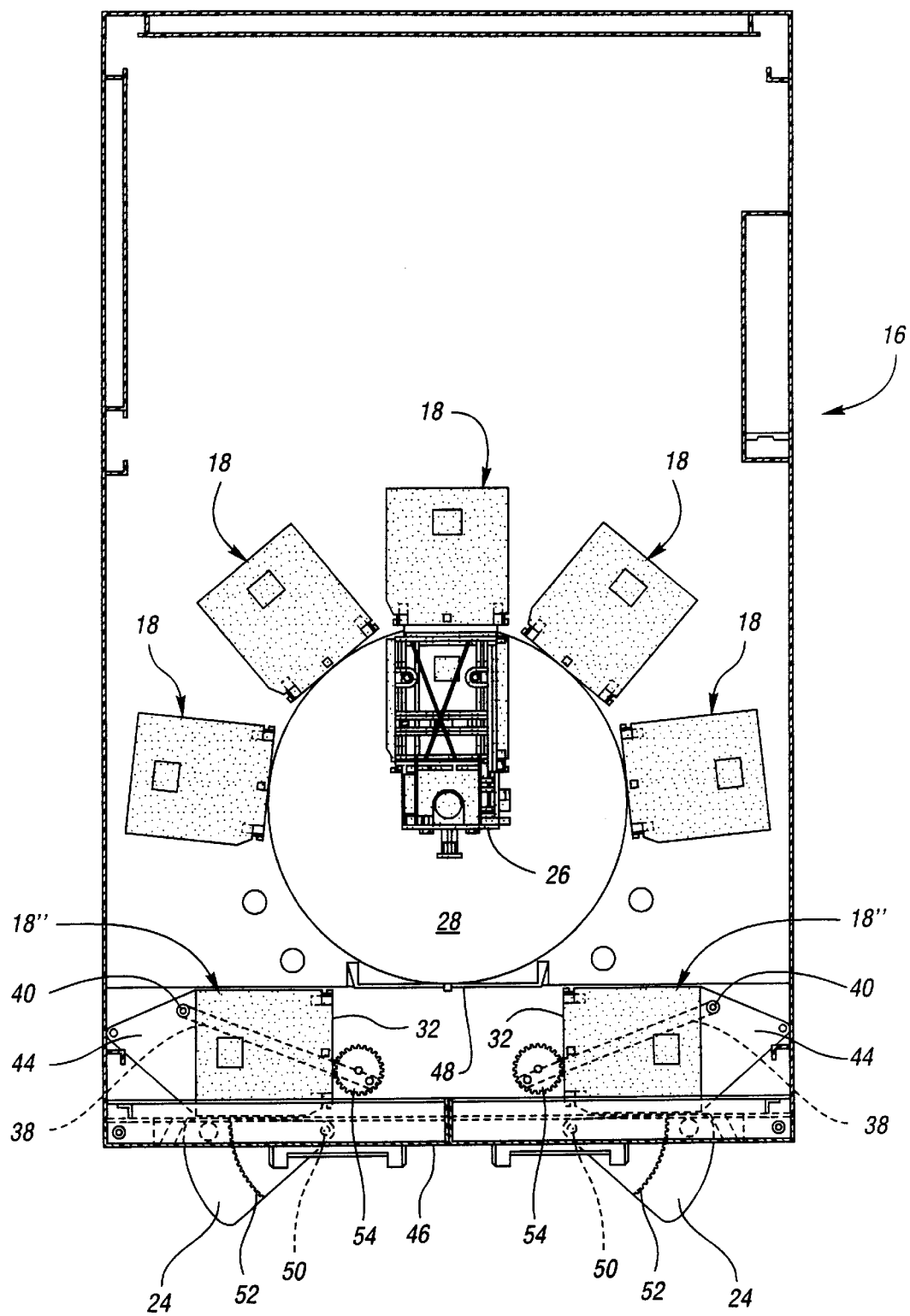
FIG. 6 is a top, sectional view of the upper section of the data storage library of the present invention shown with the limited access doors open.

Preferably, linkage arms 38 are again used as the rotating mechanism, although other rotating mechanisms could be utilized. Linkage arms 38 are connected to on one end to a limited access door 24, and on the other end to a pivot joint 40 provided on each array 18" adjacent limited access doors 24. Arrays 18" are pivotally mounted within housing 12 via pivot axles 42. FIG. 5 shows limited access doors 24 in a first, closed position, which prevents access to movable arrays 18". In FIG. 6, limited access doors 24 have been rotated manually about vertical pivot axes 50, which in turn rotates movable arrays 18" to a second, open position. Movable arrays 18" are mounted so that upon rotation, they do not interfere with baffles 48.

In upper section 16, linkage arms 38 are made operable by sector gears 52 formed into the bottom of each limited access door 24. Sector gears 52 are mated with spur gears 54 which are rotatably mounted to the interior of upper section 16. This mating drives spur gears 54 to rotate only for a partial rotation of limited access doors 24. Therefore, while limited access doors 24 are allowed to open until they are out of contact with sector gears 52 and in an open position against the front 46 of housing 12, movable arrays 18" have a much more limited rotation. As shown in FIG. 6, movable arrays 18" rotate to face each other, such that the plane of the front 32 of each array 18" is at an angle normal to the front 46 of housing 12. In this manner, manual operation of limited access doors 24, acting with stationary baffles 48, prevents access to other arrays 18 or robotic arm 26 at all times. As described for lower section 14, the open and closed positions of the limited access doors 24 and arrays 18" are controlled by locks 36 and stops 44.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A data storage library comprising:

a housing;

an access door provided in the housing;

a plurality of cartridge storage arrays mounted within the housing, the front of each array positioned to face an internal space in the housing such that cartridges contained within the storage arrays are generally unable to be accessed by an operator, wherein at least one of the arrays is movable; and a rotating mechanism coupled to the at least one movable array, wherein the rotating mechanism is operable to turn the at least one movable array from a first position inside the housing and facing the internal space, to a second position inside the housing and facing at least partially away from the internal space, allowing cartridges contained within the plurality of cartridge storage arrays to be accessed by an operator through the access door, wherein the rotating mechanism is actuated by opening the access door.

2. A data storage library comprising:

a housing;

an access door provided in the housing;

a plurality of cartridge storage arrays mounted within the housings, the front of each array positioned to face an internal space in the housing such that cartridges contained within the storage arrays are generally unable to be accessed by an operator, wherein at least one of the arrays is movable;

a rotating mechanism coupled to the at least one movable array, wherein the rotating mechanism is operable to turn the at least one movable array from a first position inside the housing and facing the internal space, to a second position inside the housing and facing at least partially away from the internal space, allowing cartridges contained within the plurality of cartridge storage arrays to be accessed by an operator through the access door, wherein the rotating mechanism comprises a linkage arm connecting the access door to the at least one movable array.

3. An automated data storage library comprising:

a housing;

an access door provided in the housing;

a robotic arm affixed within an internal space of the housing;

a plurality of cartridge storage arrays mounted within the housing, the front of each array positioned to face the robotic arm such that cartridges contained within the arrays are generally unable to be accessed by an operator, wherein at least one of the arrays is movable; and a linkage arm pivotally connecting the access door to the at least one movable array, wherein opening the access door rotates the linkage arm to turn the at least one movable array to from a first position inside the housing and facing the robotic arm, to a second position inside the housing and facing at least partially away from the robotic arm, allowing cartridges contained within the plurality of cartridge storage arrays to be accessed by an operator.

* * * * *